May 6, 1952     T. H. SEELY     2,595,418
CLUTCH TRIPPING MECHANISM
Filed June 28, 1946
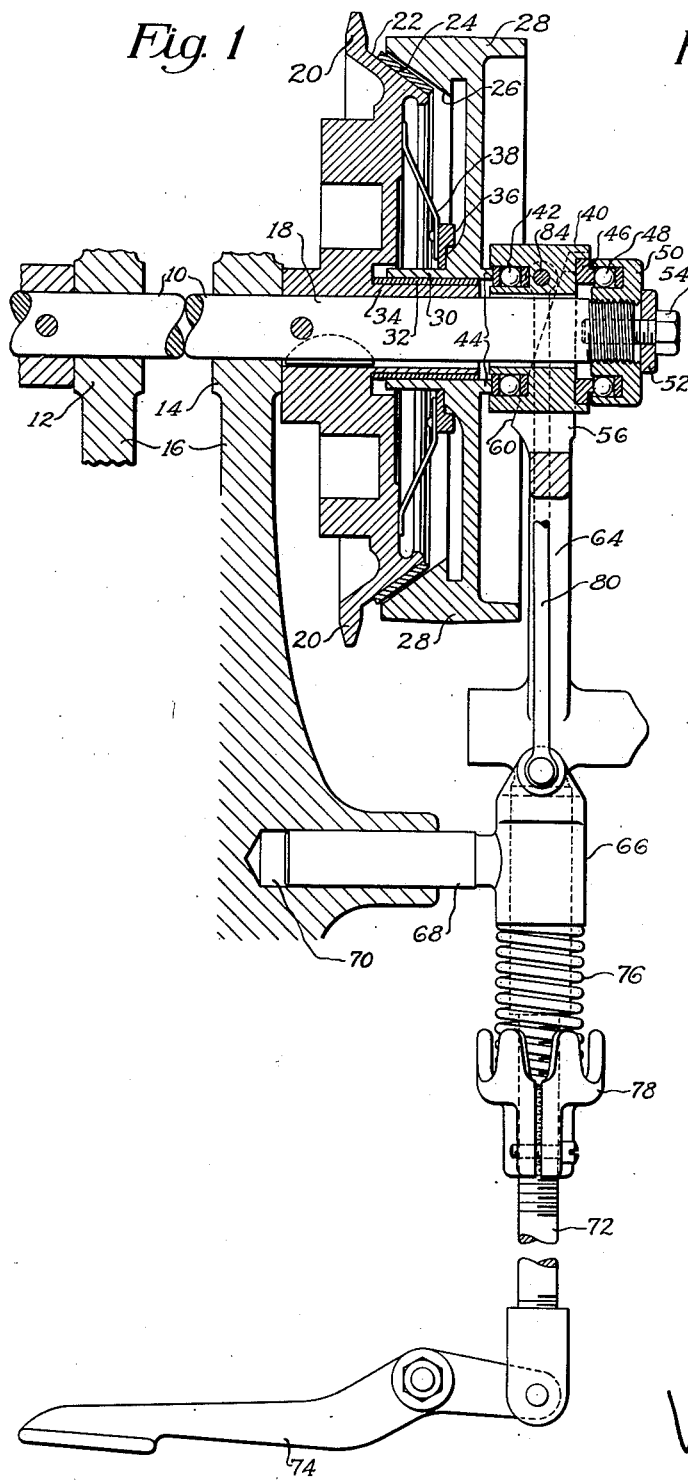
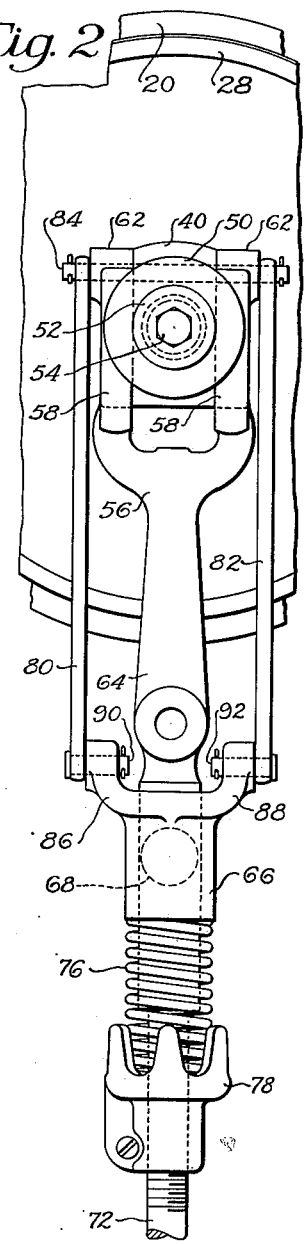
*Inventor*
Thomas H. Seely
By his Attorney Patented May 6, 1952

2,595,418

UNITED STATES PATENT OFFICE 2,595,418

CLUTCH TRIPPING MECHANISM

Thomas H. Seely, Melrose, Mass., assignor to United Shoe Machinery Corporation, Flemington, N. J., a corporation of New Jersey Application June 28, 1946, Serial No. 680,181

5 Claims. (Cl. 192—93)

This invention is concerned with improvements in clutch tripping mechanisms and is herein illustrated as embodied in a fastening inserting machine of the type disclosed in Letters Patent of the United States No. 786,190, granted March 28, 1905, on an application filed in the name of Louis A. Casgrain.

Fastening inserting machines of the type referred to include in their general organization a main drive shaft rotatably mounted in spaced bearings and having an overhanging end portion freely extending from one of the bearings. The overhanging end portion of the shaft carries a clutch by means of which the shaft is rotated. The clutch comprises a driving member mounted to rotate freely on the shaft and to be movable in the axial direction thereof into and out of clutching engagement with a driven clutch member. The driven clutch member is splined on the shaft to rotate therewith and is immovable in the axial direction of the shaft. There is provided a clutch shifting or clutch tripping member displaceable in the axial direction of the shaft to bring about an axial displacement of the driving clutch member into clutching engagement with the driven member. To move the clutch shifting member for the purpose of engaging the clutch, there is provided a controlling member movable by the operator transversely to the shaft and provided with wedge faces which cooperate with corresponding wedge faces on the clutch shifting member. While clutch mechanisms of the above described type have been in use for many years and have been generally satisfactory, it has been found that the stress imparted to the clutch shifting member and directed transversely to the shaft is apt to put an undesirable load on the overhanging end portion of the shaft, at times causing an upward deflection of that portion.

It is therefore an object of the invention to obviate the above mentioned difficulties and, in particular, to overcome the above stated tendency to deflect the overhanging end portion of the main shaft, encountered in machines of the above identified type.

To this end and in accordance with one feature of the invention, there is provided a support for the clutch shifting member, the support being mounted independently of the clutch mechanism and adapted effectively to absorb the transverse thrust of the clutch shifting member and thus to prevent that member from tending to deflect the overhanging portion of the shaft.

In accordance with another feature of the invention, the clutch shifting member, which, as stated, is movable in the axial direction of the shaft and, in the machines of the above identified type, has a close sliding fit on the shaft, is mounted with considerable looseness or play on the shaft, with the result that no transverse stress of that member is apt to be transmitted to the shaft.

These and other features of the invention will now be described in detail with reference to the accompanying drawings and will be pointed out in the appended claims.

In the drawings,

Fig. 1 is a view in side elevation of a clutch and clutch tripping mechanism, partly in section, the mechanism embodying features of the present invention; and Fig. 2 is a view in rear elevation of the mechanism illustrated in Fig. 1.

As stated above, the invention is herein illustrated as embodied in a fastening inserting machine, more specifically, in a slugging machine of the type disclosed in the above identified Letters Patent. Only so much of the slugging machine is shown and described herein as is necessary for an understanding of the invention. For a full disclosure of the type of machine to which the invention is applied, reference may be had to the above mentioned Letters Patent.

The slugging machine disclosed in the above mentioned Letters Patent has a main shaft, identified herein at 10, which is mounted for rotation in spaced bearings 12 and 14 provided in the frame 16 of the machine. The main shaft 10 has an end portion 18 which extends freely beyond the bearing 14.

Keyed on the main shaft 10 for rotation therewith and located in abutting relation to the bearing 14 is a driven frusto-conical clutch member 20 having an inclined clutch face 22 on which is secured an annular friction member 24. With the inclined clutch face 22 of the driven clutch member 20 is adapted to cooperate an inclined face 26 of a driving clutch member 28. The driving clutch member 28, which is in the form of a pulley continuously rotated by a belt (not shown), has a hub 30 which is mounted for sliding movement in the axial direction of the shaft 10 on a bearing sleeve 32. The bearing sleeve 32 is mounted on the rearwardly extending hub 34 of the driven clutch member 20. It will be seen that the driving clutch member 28 is rotatable freely about the axis of the shaft 10 and is displaceable in the axial direction of the shaft 10 into and out of clutching engagement with the clutch member 20.

When the machine is at rest the clutch is disengaged and the clutch members 20 and 28 are held separated. To this end there is provided an annular member 36 resting against a shoulder provided at the hub 30 of the driving clutch member 28. Secured to the annular member 36 are spring arms 38 the outer ends of which rest against the rear face of the clutch member 20 which, as stated, is immovable in the axial direction of the shaft 10. Thus the spring arms 38 tend to push the driving clutch member 28 out of engagement with the driven clutch member 20.

To engage the clutch there is provided a clutch tripping mechanism including a clutch shifting member 40 in the form of a block surrounding the shaft 10 with sufficient play so as not to transmit transverse stresses, to which it may be subject, to the shaft 10. The clutch shifting member 40 is movable in the axial direction of the shaft 10 as will be described. In the front end of the clutch shifting member 40 there is provided a thrust bearing 42 which is engaged by an annular lip 44 extending from the rear face of the driving clutch member 28. Secured in the rear end of the clutch shifting member 40 is a ring member 46 which, in the initial position of the member 40 (Fig. 1), bears against a thrust bearing 48 provided in a fixed collar 50 screwed onto the threaded end of the shaft 10. The collar 50 is held in place by a washer 52 and a screw 54 threaded axially into the rear end face of the shaft 10. It is to be noted that, in addition to the above-mentioned provision for play between the clutch shifting member 40 and the shaft, sufficient clearance is provided both between the member 40 and the concentric sides of the annular lip 44, and similarly between the ring member 46 and the adjacent portions of the collar 50.

To move the clutch shifting member 40 in the axial direction of the shaft 10 toward the left of Fig. 1 for the purpose of engaging the clutch, there is provided a fork-shaped clutch controlling member 56 straddling the shaft 10 and provided at opposite sides of the shaft with wedge blocks 58 having inclined faces 60 which cooperate with inclined faces 62 provided on the clutch shifting member 4 at opposite sides of the shaft 10. The clutch controlling member 56 is movable heightwise of the machine and thus transversely to the shaft 10. Upward movement of the clutch controlling member 56 causes an axial displacement of the clutch shifting member 40 toward the left of Fig. 1 because of the wedging action between the inclined faces 60 and 62 of the members 40 and 56. As a result, the clutch member 28 is displaced in the axial direction of the shaft 10 toward the left of Fig. 1 into clutching engagement with the clutch member 20 and, consequently, the clutch member 20 and with it the main shaft 10 are rotated. It will be seen that the axial displacement of the driving clutch member 28 toward the left of Fig. 1 causes the spring arms 38 to be flattened, thus increasing their tendency to displace the clutch member 28 toward the right of Fig. 1 into inoperative position, which displacement is made possible as soon as the clutch controlling member 56 is lowered to its initial position, thus also returning the clutch shifting member 40 into its initial position.

To move the clutch controlling member 56 heightwise of the machine it is provided with a downwardly extending stem 64 which passes loosely through a bushing 66. The bushing 66 is provided with a forwardly extending horizontal stem 68 located in a bore 70 in the frame 16 of the machine. Into the lower end of the stem 64 there is threaded a treadle rod 72 the lower end of which is pivotally connected to a treadle 74. The treadle rod 72 is normally held in its lowermost position by a spring 76 mounted on the lower end portion of the stem 64 and the upper end of the treadle rod 72 and confined between the lower end of the bushing 66 and a spring retaining member 78 surrounding the treadle rod 72 and clamped thereto. Actuation of the treadle 74 elevates the rod 72 and the member 56.

As previously explained and illustrated in Fig. 1, the clutch shifting member 40 does not contact the shaft 10 and has considerable clearance therewith. In like manner, adequate clearance has been provided both between the members 40 and 44, and between the members 46 and 50. Thus, if the member 40 were to be eccentrically displaced slightly with respect to the shaft, the accompanying transverse force would not be transmitted to the shaft either directly or through the hub 30 or collar 50 which are mounted upon the shaft. In order to support the clutch shifting member 40 there are provided two parallel upright links 80 and 82 the upper ends of which are pivotally secured by a pin 84 to the clutch shifting member 40. The above mentioned bushing 66 has two upwardly and laterally extending arms 86 and 88 to which the lower ends of the links 80 and 82 are pivotally secured by pins 90 and 92.

Axial displacement of the clutch shifting member 40 toward the left of Fig. 1 by the clutch controlling member 56 is accomplished, as explained, by a force transmitted to the clutch shifting member transversely to the axis of the shaft 10. Accordingly the clutch shifting member 40 is stressed transversely to the shaft 10 while it is moved in the axial direction of the shaft toward the left of Fig. 1. In order to prevent any transmission of this transverse force from the clutch shifting member 40 to the shaft 10, there is provided, in addition to the above mentioned clearances between the respective members 10 and 40, 40 and 44, and 46 and 50, the just described support, specifically, the links 80 and 82 which absorb the transverse force transmitted to the clutch shifting member 40 and which, furthermore, in view of their pivotal mounting, are capable of participating in the movements of the clutch shifting member 40 in the axial direction of the shaft 10 toward the left or toward the right of Fig. 1.

The operation of the clutch tripping mechanism having been included in the above description of that mechanism, it is believed unnecessary to repeat its description here.

Having described my invention, what I claim as new and desire to secure by Letters Patent of the United States is:

1. In a fastening inserting machine provided with spaced bearings, a drive shaft rotatable in said bearings and having an end portion freely extending beyond one of the bearings, a clutch having a driven member fixed on said end portion and a driving member arranged for axial movement with relation to said end portion into and out of clutching engagement with the driven member, and springs biased to disengage said clutch members; the combination of a clutch shifting mechanism comprising a clutch shifting member for directly acting on the driving clutch member to engage the clutch against the action of the springs, and a support for the clutch shifting member independent of the shaft, said clutch shifting member being arranged on said support for axial movement with relation to the shaft, said support being arranged to absorb thrusts on said shifting member directed transversely of the shaft without transmitting such thrusts to the shaft.

2. In a fastening inserting machine provided with spaced bearings, a drive shaft rotatable in said bearings having an end portion freely extending beyond one of the bearings, and a clutch having a driven member fixed on said end portion and a driving member arranged for axial movement with relation to said end portion into and out of clutching engagement with the driven member; the combination of a clutch shifting mechanism comprising a clutch shifting member movable axially with relation to the free end portion of the shaft to throw said driving member into engagement with said driven member, a support for said clutch shifting member, said clutch shifting member and said support being mounted independently of the shaft, said support being arranged to absorb thrusts on said clutch shifting member directed transversely of the shaft without transmitting such thrusts to the shaft, and a clutch controlling member engaging the clutch shifting member and adapted to move transversely of the shaft to cause axial movement of said clutch shifting member.

3. In a fastening inserting machine provided with spaced bearings, a drive shaft rotatable in said bearings having an end portion freely extending beyond one of the bearings, a clutch having a driven member fixed on said end portion and a driving member arranged for axial movement with relation to said end portion into and out of clutching engagement with the driven member, and springs biased to disengage said clutch members; the combination of a clutch shifting mechanism comprising a support mounted independently of the shaft for axial movement with relation to the free end portion of the shaft, a clutch shifting member carried by said support mounted with play on said end portion so as to be capable of slight displacement transversely of the shaft, said clutch shifting member being movable axially with said support to throw in the clutch, said support being arranged to absorb transverse thrust on said clutch shifting member without transmitting such thrusts to the shaft, and a clutch controlling member engaging the clutch shifting member and arranged to move transversely of the shaft for the purpose of displacing the shifting member in the axial direction of the shaft against the action of the springs.

4. In a shifting mechanism adapted to shift one of two rotatable power transmitting units axially on a shaft into or out of engagement with the other unit against a yieldable pressure directed as to oppose said shifting of the unit; the combination of a shifting member for directly acting upon that unit which is to be shifted and arranged for axial movement with relation to the shaft without maintaining contact with the shaft upon application to the shifting member of a force directed transversely of the shaft, and a support for the shifting member independent of the shaft movable axially with the shifting member and arranged to absorb transverse thrusts applied to the latter during axial movement thereof without transmitting such thrusts to the shaft.

5. In a shifting mechanism adapted to shift one of two rotatable power transmitting units axially on a shaft into or out of engagement with the other unit against a yieldable pressure directed as to oppose said shifting of the unit; the combination of a fixed support, arms extending heightwise and pivotally secured at their lower ends to said fixed support to enable them to move axially relative to the shaft, a shifting member supported by said arms and adapted to move that power transmitting unit which is to be shifted into or out of engagement with the other unit, said shifting member being mounted for axial movement with said arms relative to said shaft and being provided with an inclined face, said support and said arms being arranged to absorb thrusts on said shifting member directed transversely of the shaft, a controlling member arranged for movement transversely of the shaft and provided with an inclined face adapted to engage the inclined face of the shifting member to cause axial movement of the latter against the yieldable pressure, and operator controlled means for moving said controlling member transversely of the shaft.

THOMAS H. SEELY.

REFERENCES CITED

The following references are of record in the file of this patent:

UNITED STATES PATENTS

| Number | Name | Date |
| --- | --- | --- |
| 938,474 | Glass | Nov. 2, 1909 |
| 1,218,771 | Woeschen | Mar. 13, 1917 |
| 1,311,299 | Therien | July 29, 1919 |
| 1,547,355 | Baya et al. | July 28, 1925 |
| 1,751,646 | Nieman | Mar. 25, 1930 |
| 1,822,160 | Matthews | Sept. 8, 1931 |
| 2,035,988 | Seabury | Mar. 31, 1936 |
| 2,369,417 | Spase | Feb. 13, 1945 |